July 18, 1944.  W. P. SCHMITTER  2,354,174
FLUID PRESSURE CLUTCH
Filed Sept. 15, 1941

Walter P. Schmitter
INVENTOR.

BY
ATTORNEY.

Patented July 18, 1944

2,354,174

UNITED STATES PATENT OFFICE 2,354,174

FLUID PRESSURE CLUTCH

Walter P. Schmitter, Wauwatosa, Wis., assignor to The Falk Corporation, Milwaukee, Wis., a corporation of Wisconsin Application September 15, 1941, Serial No. 410,883

3 Claims. (Cl. 192—88)

This invention relates to fluid pressure clutches of the type involving a fluid pressure container expandable to provide a releasable driving connection between the driving and driven clutch elements.

One object of the present invention is to provide a centrifugally controlled fluid pressure clutch of the type mentioned.

Another object is to provide, in a fluid pressure clutch of the type mentioned, a device responsive to the speed of the driving element for controlling the clutch. With such an arrangement the driver may start free from load resistance and thereafter automatically assume the load upon attaining a predetermined speed.

Another object is to provide a fluid pressure clutch under the control of a centrifugally controlled valve.

Other more specific objects and advantages will appear from the following description of an illustrative embodiment of the present invention.

Figure 1:
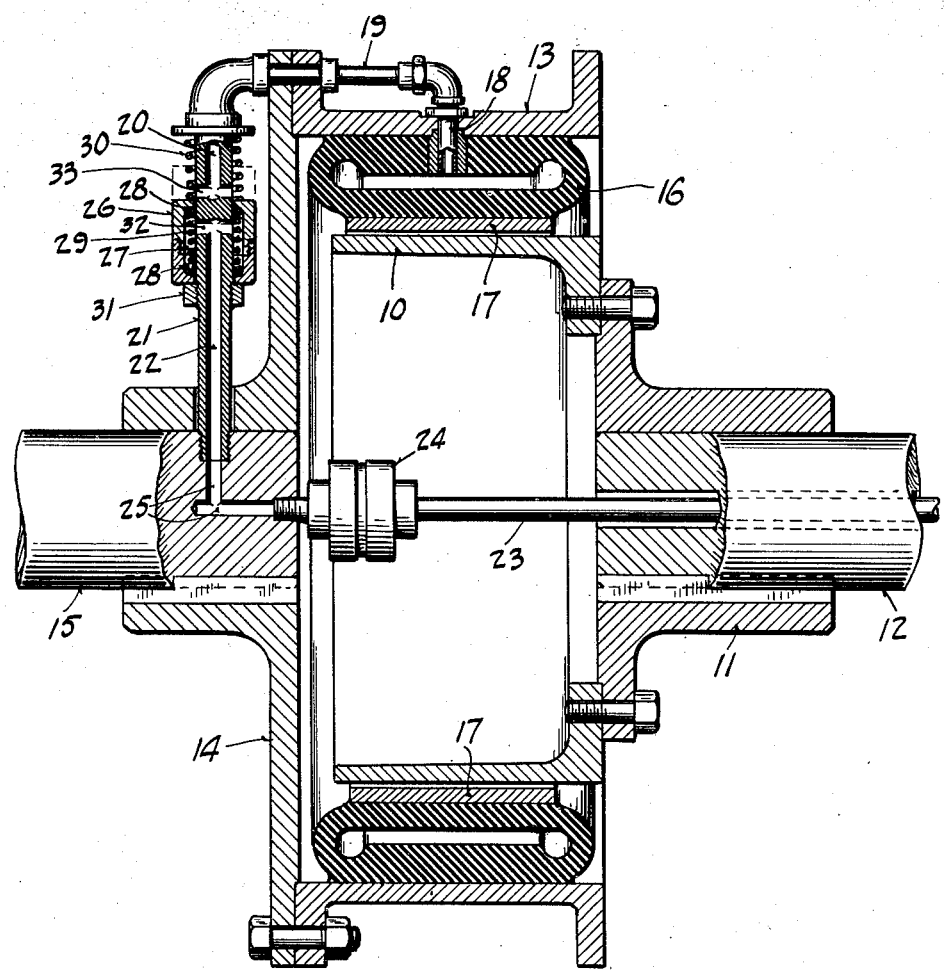
Figure 1 is a sectional view of a fluid pressure clutch embodying the present invention.

The clutch selected for illustration comprises an inner element 10 in the form of a drum attached to a flanged collar 11 keyed or otherwise fixed to a driven shaft 12; and an outer element 13 in the form of a drum disposed concentrically of and surrounding the inner drum 10 and attached to a disk 14 keyed or otherwise fixed to a drive shaft 15.

A flexible fluid pressure container 16, preferably attached to one of the drums and expandable into gripping engagement with the other drum, provides a releasable driving connection therebetween. In this instance the fluid pressure container 16 comprises a hollow annular gland of rubber, preferably internally reinforced by embedded cords or fabric as in ordinary pneumatic tire construction, vulcanized or otherwise surface bonded to and within the outer drum 13 and expandable into frictional gripping engagement with the inner drum 10 upon admission of fluid pressure thereto. The gland 16 is preferably provided on its inner face with appropriate friction material 17 attached thereto.

The admission and exhaust of fluid, preferably air, to and from the gland 16 is through an appropriable tube 18 which in this instance extends through the wall of the drum into and through the outer wall of the gland. The tube 18 communicates through appropriate piping 19 with an axial duct or channel 20 in the outer end of a rod 21 which is fixed to and extends radially from the drive shaft 15. A second axial duct or channel 22 in the lower end of the rod 21 communicates at all times with an appropriate fluid pressure source through a non-rotating pipe 23, a swivel joint 24 of a well known type, and appropriate ducts 25 in the drive shaft 15. The pipe 23 is shown loosely extending axially through the driven shaft 12.

An appropriate valve, of which the rod 21 constitutes a part, controls the application and discharge of fluid pressure to and from the gland 16. The valve shown comprises a sleeve 26 fitted to slide axially along the radial rod 21 and having an internal annular channel 27 extending lengthwise thereof. Packing rings 28 pressed against the ends of the channel 27 by an interposed coil spring 29 seal the joints between the ends of the sleeve 26 and the rod 21. A spring 30 acting against the upper or outer end of the sleeve 26 urges the same downwardly or inwardly against a stop collar 31 fixed to the rod, but the sleeve is centrifugally urged outwardly against the pressure of the spring 29 during rotation of the drive shaft 15.

Figure 2:
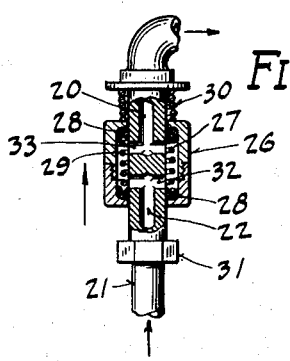
Fig. 2 is a sectional view of the control valve shown in Fig. 1, illustrating the "on" position thereof.

In all positions of the sleeve 26 along the rod 21, the channel 27 communicates with the fluid pressure duct 22 through radial ports or channels 32 disposed at the upper end of the duct. The upper duct 20 communicates with similar ports 33, so positioned as to be uncovered by the sleeve 26 when the latter is in its inner position against the collar 31. The ports or channels 33 thus function as exhaust ports through which the fluid pressure in the gland 16 is released when the sleeve 26 is in the inner position just described. However, as the sleeve 26 moves outwardly under the centrifugal forces resulting from rotation of the drive shaft 15, the channel 26 is ultimately brought into communication with the ports 33, as indicated in Fig. 2. Fluid pressure is then transmitted through the ports 33, duct 29, piping 19, and tube 18 into the gland 16 to expand the latter and thereby close the clutch. This of course occurs when the drive shaft 15 has attained a certain speed predetermined by the weight of the sleeve 26 and the degree of compression in the spring 30.

It will thus be noted that the clutch is normally open when the drive shaft 15 is at rest, since the sleeve 26 is then normally retracted and gland 16 is open to the atmosphere through the ports 33 and therefore retracted from the drum 10.

Therefore, at the time of starting, the drive shaft 15 is disconnected from the driven shaft 12 and free from the resistance offered by the torque load on the latter. As the drive shaft 15 comes up to speed, however, the valve sleeve 26 functions automatically to effect communication between the ports 33 and the channel 27 and thereby effect transmission of fluid pressure to the gland 16 to expand the latter and thereby close the clutch.

Various changes may be made in the embodiment of the invention hereinabove specifically described without departing from or sacrificing the advantages of the invention as defined in the appended claims.

I claim:

1. A clutch comprising a pair of driving and driven clutch members, fluid pressure means expandable to effect a driving relation between said members and contractable to break said relation, and means including a valve having an integral part centrifugally urged away from the axis of rotation of said members for controlling said fluid pressure means.

2. A clutch comprising a pair of driving and driven rotary clutch members, fluid pressure means operable to close and open said clutch, and means including a valve having channelled members relatively movable to control said fluid pressure means, one of said channelled members being movable toward and from the axis of rotation of said clutch members and centrifugally urged away from said axis by rotation of said driving clutch member.

3. A clutch comprising a pair of driving and driven rotary members, fluid pressure means operable to close and open said clutch, and means including a valve for controlling said fluid pressure means, said valve comprising a channeled part extending toward and from the axis of rotation of the clutch members and a coacting channelled part centrifugally urged along said first named part and cooperating therewith to control said fluid pressure means.

WALTER P. SCHMITTER.